United States Patent Office  3,406,904
Patented Oct. 22, 1968

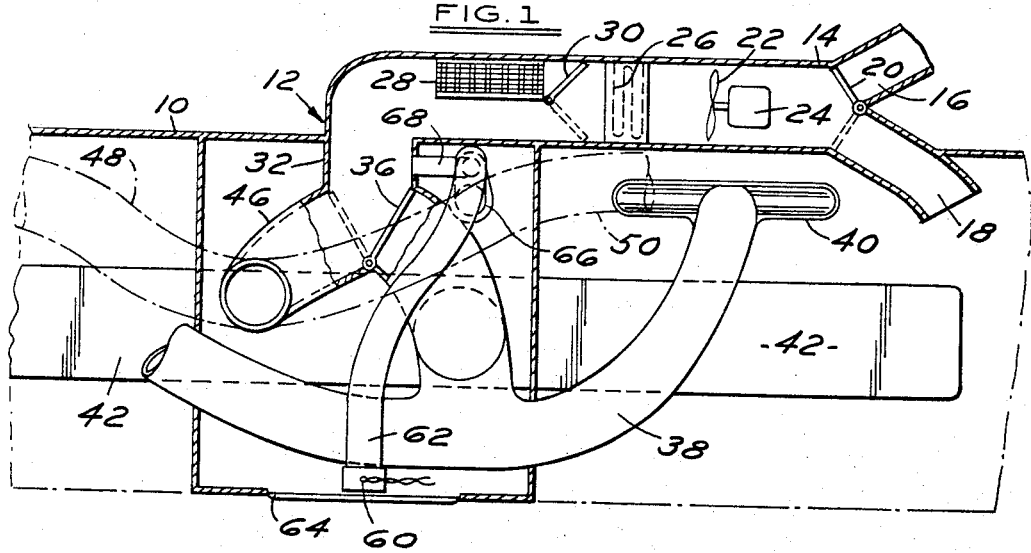
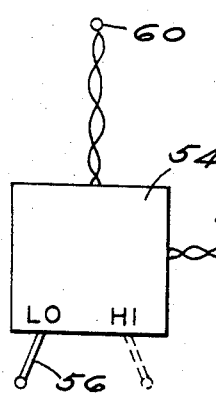
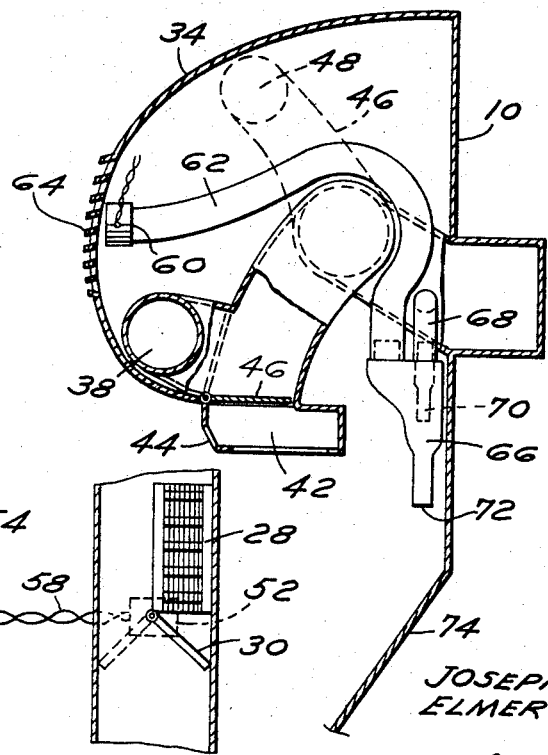

3,406,904
TEMPERATURE CONTROL SYSTEM
Joseph M. Muzzi, Detroit, and Elmer J. Rohn, Farmington, Mich., assignors to Ford Motor Company, Dearborn, Mich., a corporation of Delaware
Filed Sept. 22, 1966, Ser. No. 581,296
1 Claim. (Cl. 237—2)

ABSTRACT OF THE DISCLOSURE

A heating system for the passenger compartment of an automobile comprising a heat exchanger portion, an air distribution portion and a temperature control system. The heat exchanger portion comprises a heater coil and a bypass passage circumventing the heater coil. The temperature control system comprises a door disposed near the inlet to the heat exchanger portion and controlling the proportion of air flowing through said heater coil and said bypass passage. The temperature control system operates in response to a temperature sensing unit located behind a grille in the instrument panel and at one end of a duct. The other end of the duct is connected to a jet pump which receives air from the air distribution portion. The jet pump causes passenger compartment air to be drawn across the temperature sensing unit, and directs the air to the floor board of the vehicle adjacent the driver's feet.

---

The present invention relates generally to control systems for heating and cooling mechanisms and has particular application to control systems for temperature regulating devices in motor vehicles.

It has become the practice in automotive heating and air conditioning systems to provide temperature sensitive controls in order to maintain the interior of the passenger compartment at an even temperature preset by the vehicle operator. The temperature within the vehicle may be regulated by controlling the temperature of the engine coolant flowing through the heater core, the temperature of the refrigerant passing through the evaporator, the speed of the blower and the distribution of air through the heating core and evaporator. Any one or all of these controllable functions may be adjusted by a master control unit which responds to certain temperature sensitive elements. In one particular system, separate elements are used to sense the temperature within the vehicle, within the air conditioning unit and the outside air. These several sensed temperatures are compared with operator set temperature and one of the temperature controlling functions of the heater or air conditioning unit is raised or lowered to bring the passenger compartment temperature to that selected by the vehicle operator.

In systems of this type, it is necessary to obtain an accurate reading of the compartment temperature. The temperature gradient from one portion of the passenger compartment to another may be fairly substantial due to the relatively large window area of the vehicle and to air leakage. In order to obtain an accurate reading of the interior temperature, means are provided in accordance with the present invention for obtaining a flow of air across the temperature sensing device. A device which is merely exposed to static air will not give an entirely reliable reading as a result of the aforementioned gradient.

In accordance with the present invention, a jet pump is used to draw air from the passenger compartment over a thermistor or other temperature sensing device. The jet pump functions in the fashion of an aspirator or venturi pump in response to air flow from the high pressure side of the air conditioning blower.

With the arrangement according to the present invention, an improved reading of interior temperature is obtained.

The many objects and advantages of the present invention will become apparent upon consideration of the following discussion and the accompanying drawings, in which:

FIGURE 1 discloses a top plan view of an air heating and cooling system for a motor vehicle;

FIGURE 2 discloses a side elevational view of the structure of FIGURE 1; and

FIGURE 3 is a schematic representation of the temperature sensitive control unit.

Referring now to the drawings for a more complete understanding of the present invention, FIGURE 1 illustrates a heating and air conditioning unit installed in a motor vehicle which has a fire wall 10 separating the engine compartment and the passenger compartment. The vehicle engine is situated forwardly of the fire wall 10, which as viewed in FIGURES 1 and 2, is above and to the right, respectively, of the fire wall 10.

A combination heating and air conditioning unit 12 is connected to the fire wall and has a heat exchanger portion 14 situated in front of the fire wall. A pair of ducts 16 and 18 admit air to the heat exchanger portion 14. Duct 16 is connected to the cowl inlet of the vehicle. Duct 18 draws air from the passenger compartment side of the fire wall 10. A door 20 may be adjusted to control the flow of inlet air so that it is either 100 percent outside air from duct 16, 100 percent recirculating air from duct 18 or a blend of the two.

A blower 22 is driven by a blower motor 24 and is situated in the heat exchanger portion 14. It is adapted to draw air through the inlets 16 and 18. The blower 22 forces air through the cooling evaporator coils 26 of the air conditioning portion of the system. Air may also be forced through the heater core 28.

The volume of air passing through the heater core 28 is controlled by a door 30 which may be adjusted in position. The position of the heater inlet door 30 controls the temperature of the outlet air by determining the percentage of total air that passes over the heater core.

One hundred percent of the air passes through the cooling coils while 0% to 100% passes through the heater core as determined by the position of door 30. During cold weather, the air conditioning compressor does not run and the evaporator is as at ambient temperature. The heater core carries warm engine coolant at all times.

Air from the heat exchanger portion 14 is exhausted into the plenum chamber 32 that is situated rearwardly of the fire wall 10 and under the instrument panel 34 of the vehicle. The plenum chamber 32 has a number of different outlets for directing the flow of air dependent upon whether it is conveying cooling air or warming air. If the unit of FIGURE 1 is functioning solely as a heater, then the function control door 36 is moved to the dotted-line position of FIGURE 1 permitting air to flow through the defroster conduits 38 and the defroster outlets 40 situated adjacent to the vehicle windshield. Warmed air is also exhausted into the passenger compartment through a transversely extending heater outlet conduit 42 which has spaced openings such as opening 44 of FIGURE 2. A movable door 46 controls the percentage distribution of air between the heater outlets and defroster outlets.

When the door 36 is in the solid-line position of FIGURE 1, air from the heat exchanger portion 14 of the system is directed through the air conditioning ducts 46 to outlet ducts 48 and 50, conveniently located in the passenger compartment.

The principal temperature controlling mechanism during air conditioning operation is the door 30. The system of FIGURE 1 is referred to as a reheat air conditioner because 100 percent of the inlet air passes over the evaporator coil 26 for maximum cooling. If the outlet air from the evaporator coils is too low in temperature, all or a portion is passed over the heating coils 28 to bring it up to a comfortable level. The amount of air which passes over the heating coils 28 is determined by the position of the door 30.

Door 30, as illustrated schematically in FIGURE 3, is controlled by an electrical actuator 52 in response to a signal received from a master control unit or regulator means 54. The control unit of FIGURE 3 may take a variety of forms and includes a manually adjustable lever 56 which may be set by the vehicle operator for any desired internal passenger compartment temperature. That temperature is maintained by appropriate positioning of the door 30 by means of its actuator 52 which is connected to the control unit 54 by means of wires 58.

The control unit 54 senses temperature within the passenger compartment by means of a temperature sensing thermistor 60 which is wired electrically to the control unit 54. The thermistor 60 is situated at the rear end of the duct 62 and spaced out of sight behind the grille work 64 of the instrument panel 34. The duct 62 extends over the plenum chamber 32 and is connected to a jet pump 66. A small duct 68 is joined to the inlet of the plenum chamber 32 and conveys air into the jet pump 66. The duct 68 has an outlet 70 positioned near the venturi of the jet pump 66. Because the jet pump 66 receives primary air at an elevated pressure from the conduit 68, it works in the fashion of an aspirator to draw air through the conduit 62, through the venturi of the jet jump 66 and out the outlet 72. The outlet 72 of the pump 66 is adjacent to the toe board 74 of the vehicle and serves to cool or warm the passengers' feet in accordance with the setting of lever 56.

In the conventional passenger automobile, there is considerable temperature gradient from one portion of the vehicle to the other. In order to get a true reading of the temperature within the vehicle, it is necessary that the thermistor 60 be exposed to moving air rather than being placed in a position where it is only exposed to static air. In accordance with the present invention, means are provided for moving the air within the passenger compartment over the thermistor 60. The means for moving the air constitutes the jet pump 66 which does not require the use of any additional fans or blowers which would tend to create noise and drafts. Thus, according to the present invention an improved arrangement is provided for sensing temperature within a vehicle and for regulating the controls of the vehicle's heating and air conditioning unit.

The foregoing description presents the presently preferred embodiment of this invention. Modifications and alterations may occur to those skilled in the art that will come within the scope and spirit of the following claim.

We claim:
1. A heating system for the passenger compartment of an automobile comprising a heat exchanger portion, an air distribution portion and a temperature control system, said heat exchanger portion having an inlet, an outlet, a heat exchanger and a bypass passage, said heat exchanger being constructed to raise the temperature of the air flowing therethrough, said heat exchanger portion being arranged so that air flowing from said inlet to said outlet must flow through either said heat exchanger or said bypass passage, said heat exchanger and said bypass passage being mutually exclusive, temperature regulating means comprising an air flow directing door constructed to proportion the flow of air between said heat exchanger and said bypass passage, an air distribution portion having an air inlet and a plurality of air outlets, said outlet of said heat exchanger portion being connected to said inlet of said air distribution portion, a blower means disposed in said heat exchange portion and constructed to force air through said heat exchanger portion and out said air distribution portion outlets, a firewall, said heat exchanger portion being disposed on one side of said firewall and said air distribution portion being disposed on the other side, an instrument panel in said passenger compartment and enclosing a major portion of said air distribution portion, a temperature sensing unit connected to said regulating means, said regulating means being responsive to a temperature signal received from said temperature sensing unit, said instrument panel having an open grille work and said temperature sensing unit being disposed behind said grille work, said temperature sensing unit being situated at one end of a first air duct, the other end of said first air duct being connected to a jet pump, a second duct having one end connected to said jet pump and the other end connected to said air distribution portion on the high pressure side of said blower, said jet pump being constructed to draw passenger compartment air across said temperature sensing unit and through said first duct when air is forced by said blower through said second duct, said jet pump being located adjacent said firewall and having an outlet directed toward the toe board portion of said passenger compartment and the feet of a vehicle passanger.

References Cited

UNITED STATES PATENTS

| | | |
|---|---|---|
| 2,316,619 | 4/1943 | Raney. |
| 2,481,630 | 9/1949 | Tramontini. |
| 2,707,079 | 4/1955 | Little et al. |

EDWARD J. MICHAEL, *Primary Examiner.*